(12) United States Patent
Hoganson

(10) Patent No.: US 6,450,651 B1
(45) Date of Patent: Sep. 17, 2002

(54) ANTI-GLARE DEVICE FOR OBJECTIVE LENSES

(76) Inventor: Ted F. Hoganson, 2875 W. 2900 S., West Haven, UT (US) 84401

( * ) Notice: Subject to any disclaimer, the term of this patent is extended or adjusted under 35 U.S.C. 154(b) by 820 days.

(21) Appl. No.: 09/272,989

(22) Filed: Mar. 20, 1999

Related U.S. Application Data

(63) Continuation-in-part of application No. 08/637,270, filed on Sep. 8, 1997, now abandoned, which is a continuation-in-part of application No. 08/344,995, filed on Nov. 25, 1994, now abandoned.

(51) Int. Cl.⁷ ............................................. G02B 27/00
(52) U.S. Cl. ..................... 359/601; 359/399; 359/510; 359/511; 359/512; 359/600
(58) Field of Search .................................. 359/399, 510, 359/511, 512, 600, 601, 608, 609, 610, 611, 612, 613, 614; 42/70.6, 72, 96, 101, 100; 150/114

(56) References Cited

U.S. PATENT DOCUMENTS 4,751,950 A * 6/1988 Bock ........................... 150/52

* cited by examiner

Primary Examiner—Mohammad Sikder

(57) ABSTRACT

This invention is an anti-glare device comprising a flexible, soft material that is rolled as a sleeve to be wrapped around, while projecting from an end of an objective lens housing such as is found on telescopic scopes, spotting scopes, binoculars, cameras and video cameras to prevent sun glare on the lens or lenses of such devices regardless of the angle of the sun rays otherwise engaging such lens or lenses.

1 Claim, 3 Drawing Sheets

ANTI-GLARE DEVICE FOR OBJECTIVE LENSES

CLAIM OF PRIORITY

This application is a continuation-in-part of my prior application Ser. Nos. 08/637,270, filed Sep. 8, 1997, now abandoned, which was a continuation in part of my prior application Ser. No. 08/344,995 Nov. 25, 1994, now abandoned

FIELD OF SEARCH

359/601; 359/611; 33/244

REFERENCES CITED

U.S. PATENT DOCUMENTS

| | | | |
|---|---|---|---|
| 3,695,680 | 10/1972 | VanSickle | 359/601 |
| 4,089117 | 05/1978 | Villareal | 33/244 |
| 4,384,767 | 05/1983 | Kawai | 359/611 |
| 4,610,517 | 09/1986 | Fukino et al | 359/611 |
| 4,926,560 | 05/1990 | Kilgore et al | 33/244 |
| 5,181,140 | 01/1993 | Brown et al | 33/244 |

BACKGROUND OF THE INVENTION

The field of the invention relates to geometrical instruments and specifically to an adjustable anti-glare device for use on devices having objective lenses, i.e., a variety of telescopes spotting scopes, binoculars, cameras, and video cameras.

DESCRIPTION OF THE PRIOR ART

Sunshade equipment for use in providing protection from glare on objective lenses is used in the prior art. Examples of such devices may be found in U.S. Pat. No. 5,181,140 to Brown et al, which is for a sun shading device for binoculars, and U.S. Pat. No. 4,089,117, which is for a sunshade for a rifle scope. U.S. Pat. No. 4,384,767 to Kawai is for a hood-like structure that is clamped onto a camera lens. U.S. Pat. No. 4,610,517 to Fukino et al is for a similar type of lens hood that clamps to a lens housing. These devices are designed to reduce glare on the lenses from above, but they do not fully address the problem of glare from either side.

U.S. Pat. No. 5,201,135 to Cowles does address the problem of additional glare sources, but discloses a rigid precise device that requires complicated manufacturing methods.

U.S. Pat. No. 5,101,298 to Lentz discloses a television lens shade including a soft mounting means to surround the lens and to support separate shading structures. It does not disclose the use of the mounting means as a sun shade.

All of the above listed shading devices are specific to only one field of objective lenses, i.e. rifle scopes, binoculars or cameras. The present invention is not specific to only one field as it is so completely adjustable that it fits a variety of types of objective lenses in housings, i.e. telescopic scopes, spotting scopes, binoculars, cameras,, or video cameras.

The present invention is effective, attached easily, and quickly removed. All of the prior inventions required more complicated methods of manufacture than those required by the present invention. There continues to be a need for a new and improved anti-glare device for objective lenses and the present invention substantially fills that need.

SUMMARY OF THE INVENTION

The primary use of this invention is as an attachment to a housing for an objective lens or lenses to reduce glare upon the lens or lenses. This anti-glare device is comprised of a sheet of thin, flexible foam rubber, or the like, having sufficient rigidity to maintain a rolled assigned shape around the housing of the lens or lenses while projecting beyond an end of the housing. Strips of hook and loop type members, sold under the trade name "Velcro", or other devices, are used for holding the sheet in the rolled configuration as a sleeve around the housing and projecting beyond an end of the housing. This construction permits the attachment of the anti-glare device quickly and firmly to the housings of many different types of objective lenses. The anti-glare device of the invention is easily and quickly removed and folds up compactly and is easily stored in pockets, camera cases, etc. This anti-glare device also costs less to manufacture and fits on a larger variety of lens housings than do devices heretofore known.

DETAILED DESCRIPTION OF THE INVENTION

Figure 1:
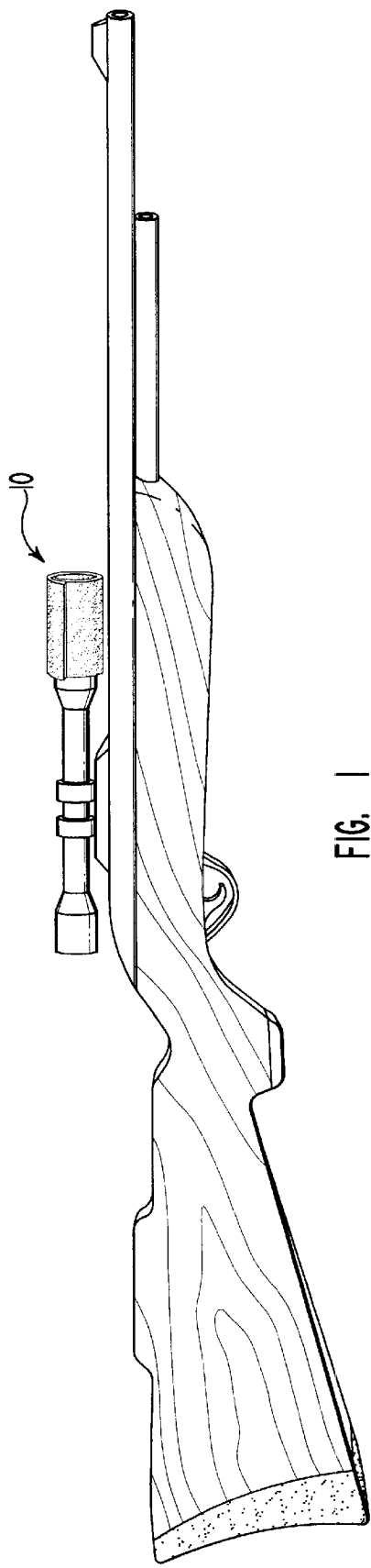
FIG. 1 is a side view of the invention attached to a rifle scope.

This anti-glare device of the invention comprises an adjustable, elongated, flexible wrap around sleeve 10 that is designed as an adjustable anti-glare device for use on housings containing objective lenses and that is particularly suitable for use on a variety of telescopic scopes, spotting scopes, binoculars,cameras, or video cameras. As illustrated in FIGS. 1, 3, 4, 5, and 6, the sleeve 10 is designed to fit snugly around the outer surface of housings of a variety of telescopic scopes, spotting scopes, binoculars, cameras and video cameras and to extend beyond the lens or lenses within the housings to provide shade. As shown in FIGS. 1, 3, 4, 5, and 6, sleeve 10 is wrapped fully around a lens housing and then is secured to itself with "Velcro" strips including loops 12 and hook like members 13, as a fastening system. Sleeve 10 is designed to prevent: light from glaring on the lens or lenses of a wide variety of telescopic scopes, spotting scopes, binoculars, cameras, and video cameras, such as are illustrated in FIGS. 1, 3, 4, 5, and 6. Sleeve 10 is constructed of any material 11 having size, flexibility, and shape holding properties to allow it to snugly grip the outer surface or surfaces of said variety of housings of telescopic scopes, spotting scopes, binoculars, cameras, or video cameras and to maintain its assigned shape, without collapsing as it projects beyond the end of the housing. Material such as foam rubber, plastic, nylon, or foam coated, light, flexible metal 11 are suitable, for example. A sufficient amount of "Velcro" loop materials 12 and hook materials 13 is used to enable the sleeve 10 to fit a variety of telescopic scopes, spotting scopes, binoculars, cameras, and video cameras.

Figure 2:
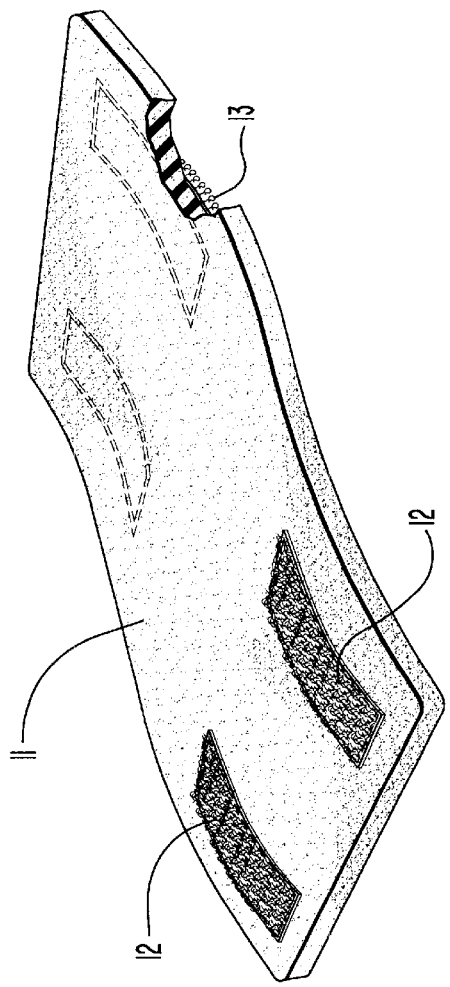
FIG. 2 is a perspective view of the invention showing proper attachment of "Velcro" fasteners.
Figure 3:
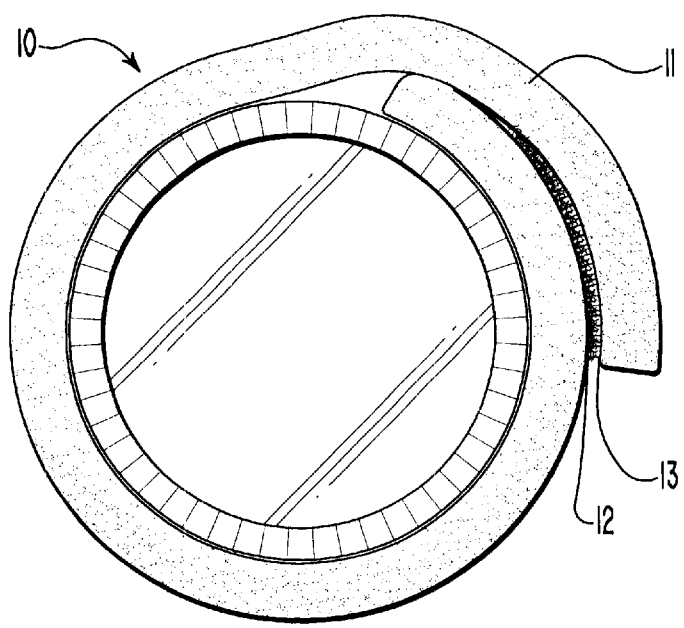
FIG. 3 is an end elevation view showing the invention attached to a spotting scope.
Figure 4:
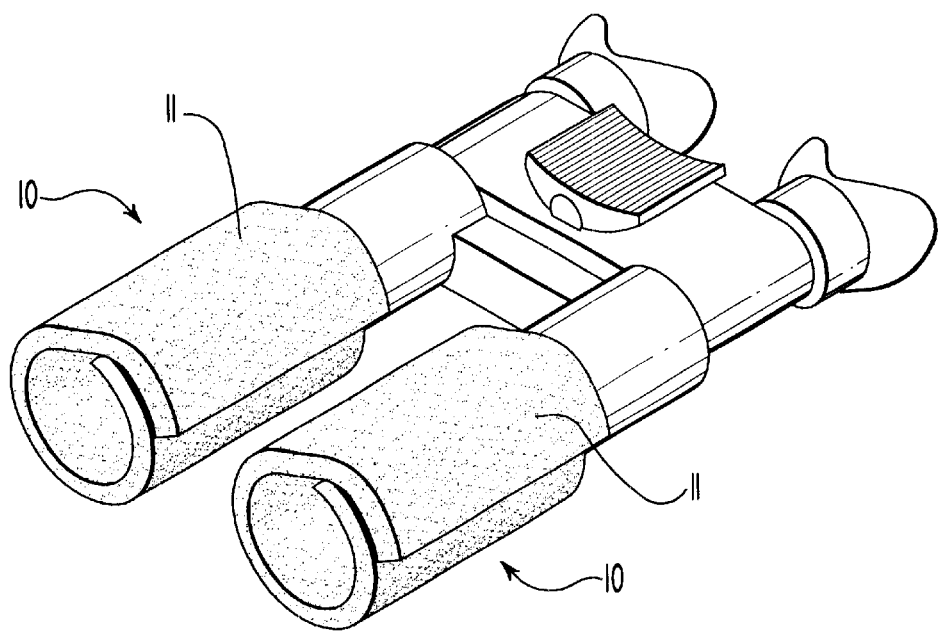
FIG. 4 is a perspective view of two units of the invention attached to binoculars.
Figure 5:
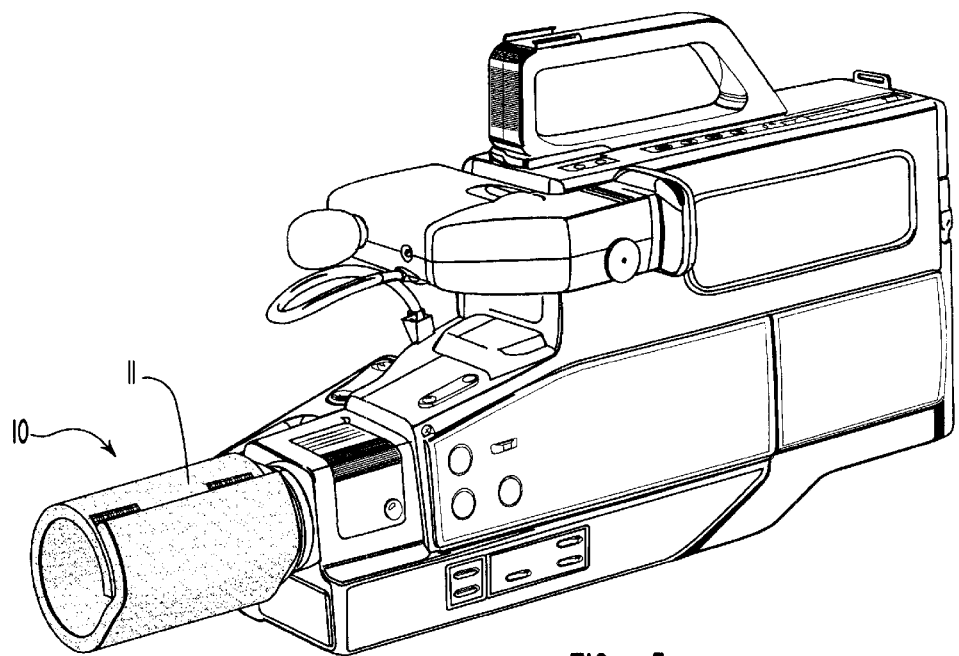
FIG. 5 is a perspective view of the invention attached to a video camera.
Figure 6:
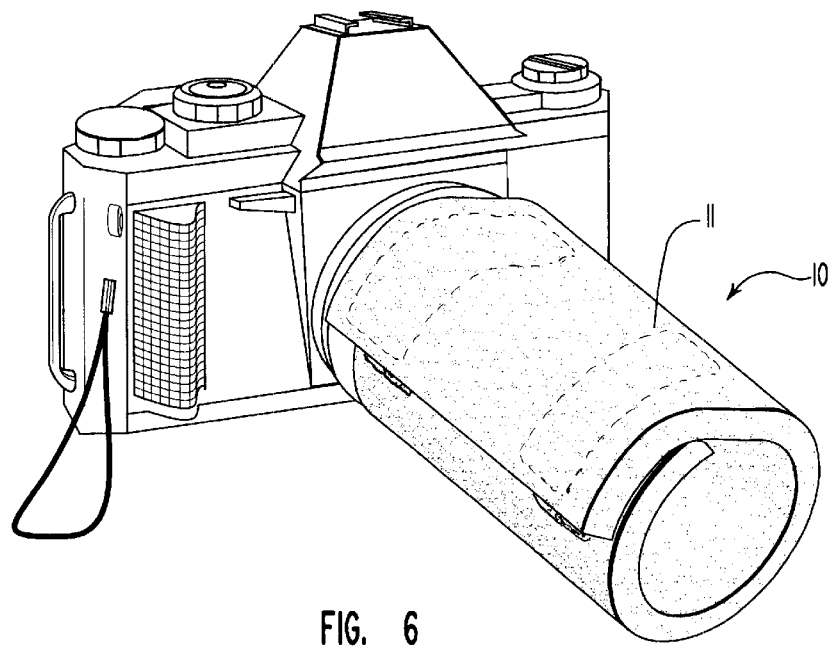
FIG. 6 is a perspective view of the invention attached to a camera.

The "Velcro" loop material strips 12 and 13 are attached by gluing or sewing to the inner and outer surfaces of the foam rubber, or the like, 11 in such a manner as to cause the foam rubber 11 to form an elongated sleeve 10 when the loop material 12 and hook material 13 surfaces of the "Velcro" material are interlocked. As best illustrated in FIG. 2, the sleeve 10 is tightly wrapped around a lens housing and is secured by means of interlocking of the "Velcro" loop material 12 and hook material 13 around the housing surface of a variety of telescopic scopes, spotting scopes, binoculars, cameras, and video cameras. For use on binoculars two units of the sleeve are required, as illustrated in FIG. 4, with one unit wrapped around the housing at the remote end of each lens assembly of the binocular, It will be apparent that the sizes and shapes of the loop material 12 and hook material 13 can be varied, as desired. However, the fastening system formed by such loop material and hook material must secure the rolled sleeve 10 to the lens housing while allowing a side edge of the sleeve to project beyond the lens housing while allowing a side edge of the sleeve to project beyond the lens housing and with the edge being held in the rolled configuration without collapsing.

Although a preferred embodiment of my invention has been herein disclosed it is to be understood that such disclosure is by way of example and that variations are possible without departing from the subject matter coming within the scope of the following claim, which subject matter I regard as my invention.

I claim:

1. An anti-glare device for use with objective lenses mounted in a housing, said device comprising:

an elongated strip of flexible, soft material having a length between ends to wrap around a housing containing objective lenses and to overlap on itself, a width to project from said housing and sufficient rigidity to maintain an encircling formation projecting from said housing;

connector means fixed to one face of one of said ends of said elongate strip of flexible, soft material; and co-operating connector means fixed to at least an opposite end of said elongate strip of flexible, soft material, said connector means interlocking when one of said ends overlaps the other of said ends when said elongate strip is wrapped around and projects from an end of said housing.

* * * * *